United States Patent
Chae et al.

(10) Patent No.: US 11,019,618 B2
(45) Date of Patent: May 25, 2021

(54) METHOD FOR TRANSMITTING AND RECEIVING SIDELINK SIGNAL BY UE IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 16/098,713

(22) PCT Filed: May 2, 2017

(86) PCT No.: PCT/KR2017/004682
§ 371 (c)(1),
(2) Date: Nov. 2, 2018

(87) PCT Pub. No.: WO2017/191999
PCT Pub. Date: Nov. 9, 2017

(65) Prior Publication Data
US 2019/0124653 A1    Apr. 25, 2019

Related U.S. Application Data

(60) Provisional application No. 62/330,834, filed on May 2, 2016.

(51) Int. Cl.
*H04W 72/04* (2009.01)
*H04W 72/02* (2009.01)
(Continued)

(52) U.S. Cl.
CPC ........... *H04W 72/0446* (2013.01); *H04L 1/08* (2013.01); *H04W 4/40* (2018.02); *H04W 72/02* (2013.01); *H04W 72/04* (2013.01)

(58) Field of Classification Search
None
See application file for complete search history.

(56) References Cited

U.S. PATENT DOCUMENTS

2008/0276148 A1*  11/2008 Lohr .................... H04L 1/1819
                                                         714/750
2012/0300662 A1*  11/2012 Wang .................. H04W 72/02
                                                         370/252
(Continued)

FOREIGN PATENT DOCUMENTS

KR       2014074616       6/2014

OTHER PUBLICATIONS

Ericsson, "Discussion on V2X PCS Scheduling, Resource Pools and Resource Patterns", RI-162833, 3GPP TSG RAN WG1 Meeting #84bis, Busan, South Korea, Apr. 1, 2016, 8 pages.

(Continued)

*Primary Examiner* — James P Duffy
(74) *Attorney, Agent, or Firm* — Fish & Richardson P.C.

(57) ABSTRACT

One aspect of the present disclosure provides a method for transmitting and receiving a sidelink signal by a first user equipment (UE) in a wireless communication system, the method comprising: identifying a transmission time interval (TTI) used for transmission by a second UE; determining a resource to be excluded in selecting a resource to be used for transmission by the first UE, based on the identified TTI; selecting a resource to be used for transmission by the first UE from resources other than the excluded resource; and transmitting a sidelink signal on the selected resource.

12 Claims, 12 Drawing Sheets

(51) Int. Cl.
*H04W 4/40* (2018.01)
*H04L 1/08* (2006.01)

(56) References Cited

U.S. PATENT DOCUMENTS

| | | | | |
|---|---|---|---|---|
| 2013/0012221 A1* | 1/2013 | Zou | ...................... | H04W 72/10 |
| | | | | 455/452.1 |
| 2014/0071954 A1* | 3/2014 | Au | ...................... | H04W 72/042 |
| | | | | 370/336 |
| 2017/0280472 A1* | 9/2017 | Gupta | ................ | H04W 72/048 |

OTHER PUBLICATIONS

Intel Corporation, "Enhancements to Sidelink Resource Pool Design for V2V", RI-162365, 3GPP TSG RAN WGI Meeting #84bis, Busan, Korea, Apr. 2, 2016, 7 pages.

Intel Corporation, "On Sensing Design Details for Sidelink V2X Communication", RI-16236, 3GPP TSG RAN WGI Meeting #84bis, Busan, Korea, Apr. 2, 2016, 10 pages.

LG Electronics, "Discussion on eNB Scheduling Enhancement for Sidelink Resource Allocation", RI-162481, 3GPP TSG RAN WGI Meeting #84bis, Busan, Korea, Apr. 2, 2016, 3 pages.

International Search Report and Written Opinion in International Application No. PCT/KR2017/004682/ dated Aug. 17, 2017, 19 pages.

Supplementary Extended European Search Report in European Appln. No. 17792901.5, dated Oct. 16, 2019, 8 pages.

Intel Corporation, "Sensing based collision avoidance schemes for V2V communication," R1-160432, 3GPP TSG RAN WG1 Meeting #84, St. Julian's, Malta, Feb. 15-19, 2016, 8 pages.

Samsung, "Sensing and resource selection for collision avoidance," R1-162676, 3GPP TSG RAN WG1 Meeting #84bis, Busan, Korea, Apr. 11-15, 2016, 6 pages.

* cited by examiner (a)

(b)

(a)

(b)

METHOD FOR TRANSMITTING AND RECEIVING SIDELINK SIGNAL BY UE IN WIRELESS COMMUNICATION SYSTEM

CROSS-REFERENCE TO RELATED APPLICATIONS

This application is a National Stage application under 35 U.S.C. § 371 of International Application No. PCT/KR2017/004682, filed on May 2, 2017, which claims the benefit of U.S. Provisional Application No. 62/330,834, filed on May 2, 2016. The disclosures of the prior applications are incorporated by reference in their entirety.

TECHNICAL FIELD

The present disclosure relates to a wireless communication system, and more particularly, to a method for transmitting and receiving a sidelink signal by a UE by which a half duplex problem may be solved, and to a device for performing the method.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF INVENTION

Technical Purpose

The present disclosure provides a method by which a UE may identify a transmission by a neighboring UE and selectively may exclude the transmission and then may transmit a sidelink signal, thereby to meet enhanced error requirements.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present disclosure, there is provided a method for transmitting and receiving a sidelink signal by a first user equipment (UE) in a wireless communication system, the method comprising: identifying a transmission time interval (TTI) used for transmission by a second UE; determining a resource to be excluded in selecting a resource to be used for transmission by the first UE, based on the identified TTI; selecting a resource to be used for transmission by the first UE from resources other than the excluded resource; and transmitting a sidelink signal on the selected resource.

In another aspect of the present disclosure, there is provided a first user equipment (UE) for transmitting and receiving a sidelink signal in a wireless communication system, the UE comprising: a transmitter and a receiver; and a processor configured for: identifying a transmission time interval (TTI) used for transmission by a second UE; determining a resource to be excluded in selecting a resource to be used for transmission by the first UE, based on the identified TTI; selecting a resource to be used for transmission by the first UE from resources other than the excluded resource; and transmitting a sidelink signal on the selected resource.

The resource to be excluded based on the identified TTI may include a resource corresponding to a TTI used for initial transmission among TTIs used for transmission by the second UE.

The resource to be excluded based on the identified TTI may include resources corresponding to M TTIs among N TTIs used for transmission by the second UE.

The M may be determined according to a sensing result by the first UE.

The resource to be excluded based on the identified TTI may include resources corresponding to all TTIs used for transmission by the second UE.

The identification of the TTI used for transmission by the second UE may be based on a result of sensing by the first UE.

The identification of the TTI used for transmission by the second UE may be based on a result of decoding by the first UE of control information transmitted by the second UE.

The TTI corresponding to the initial transmission may be configured to be shorter than a TTI corresponding to re-transmission.

In the TTI corresponding to the initial transmission, frequency multiplexing-based transmission may be not allowed.

In a TTI corresponding to re-transmission other than the TTI corresponding to the initial transmission, frequency multiplexing-based transmission may be allowed.

A length of the TTI may vary depending on a resource pool.

A TTI length when the resource pool is allocated to a road with a number of UEs smaller than a preset value may be larger than a TTI length when the resource pool is allocated to a road with a number of UEs equal to or larger than the preset value.

Technical Effects

According to the present disclosure, the half duplex problem can be solved and the enhanced error requirement can be satisfied.

It will be appreciated by persons skilled in the art that the objects that could be achieved with the present invention are not limited to what has been particularly described hereinabove and other objects that the present invention could achieve will be more clearly understood from the following detailed description.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of the disclosure. In the drawings.

BEST MODE FOR CARRYING OUT INVENTION

Figure 1:
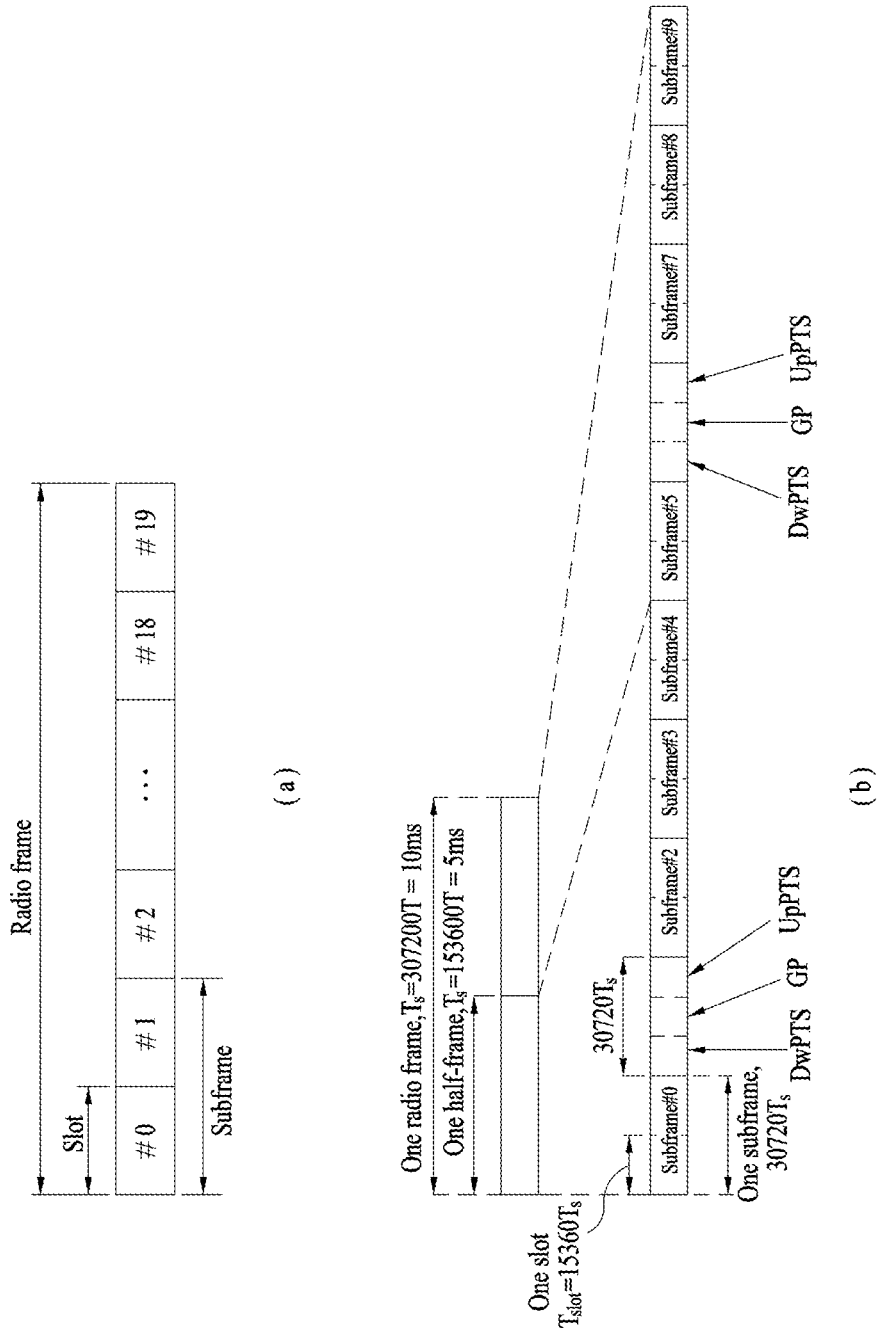
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-

OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
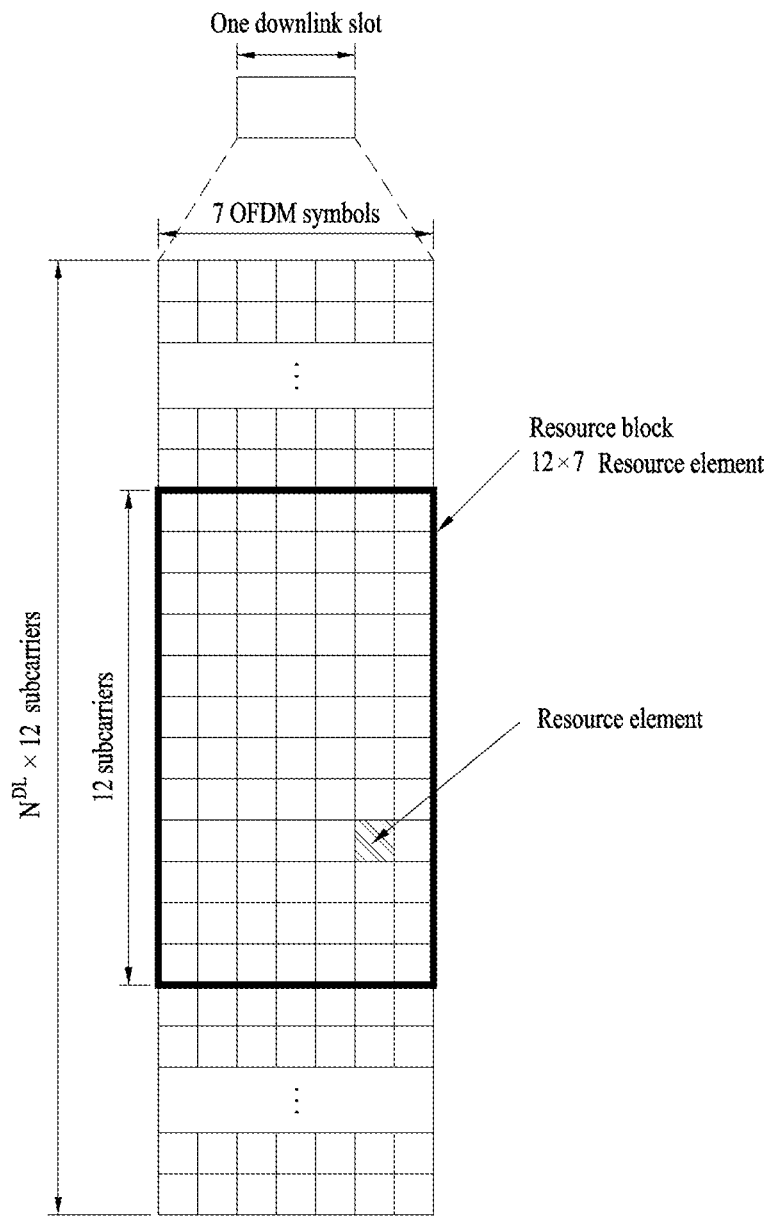
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
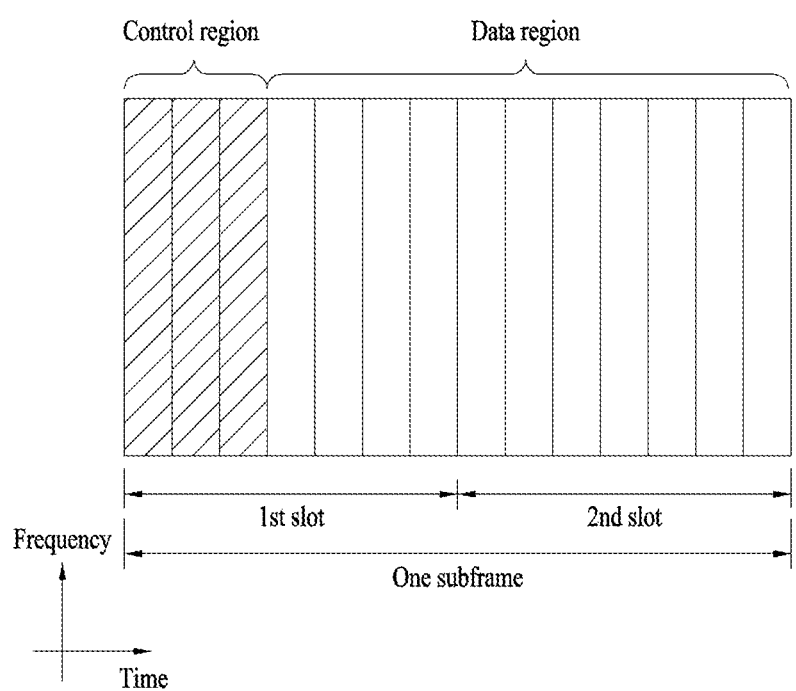
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
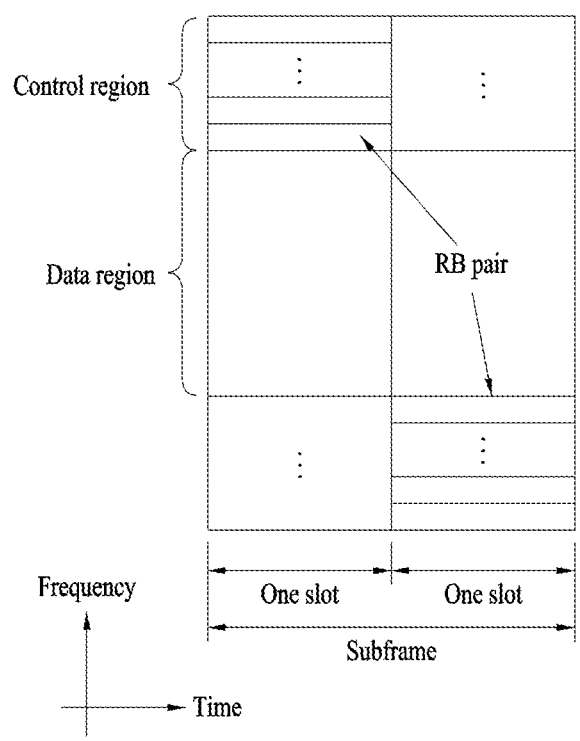
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
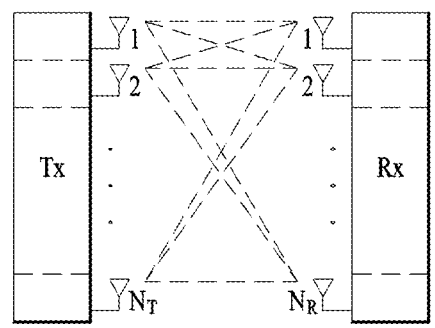
FIG. 5 is a view illustrating the configuration of a wireless communication system having multiple antennas.
Figure 5:
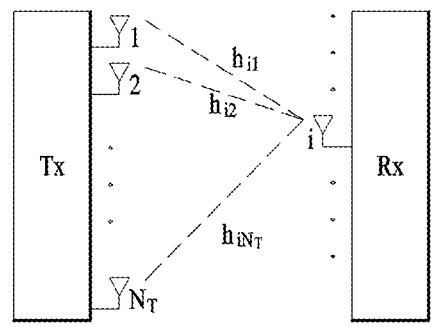

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{s}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows:

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

In one example, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
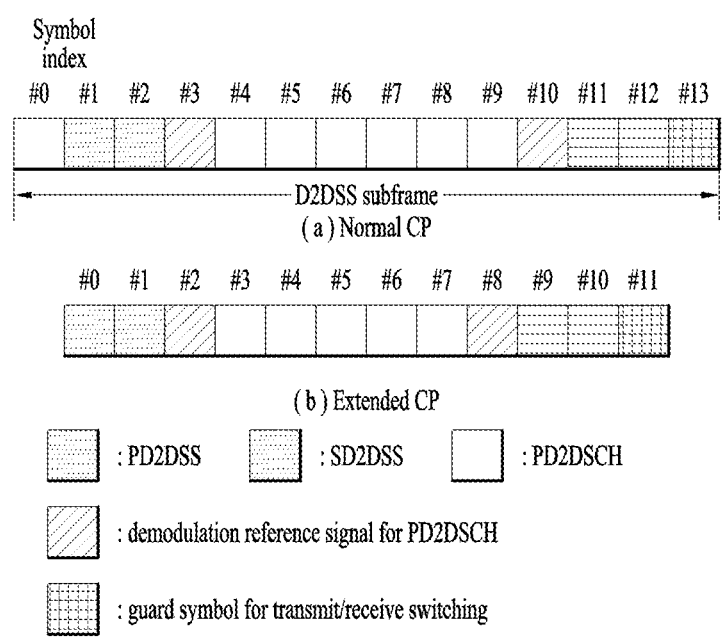
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
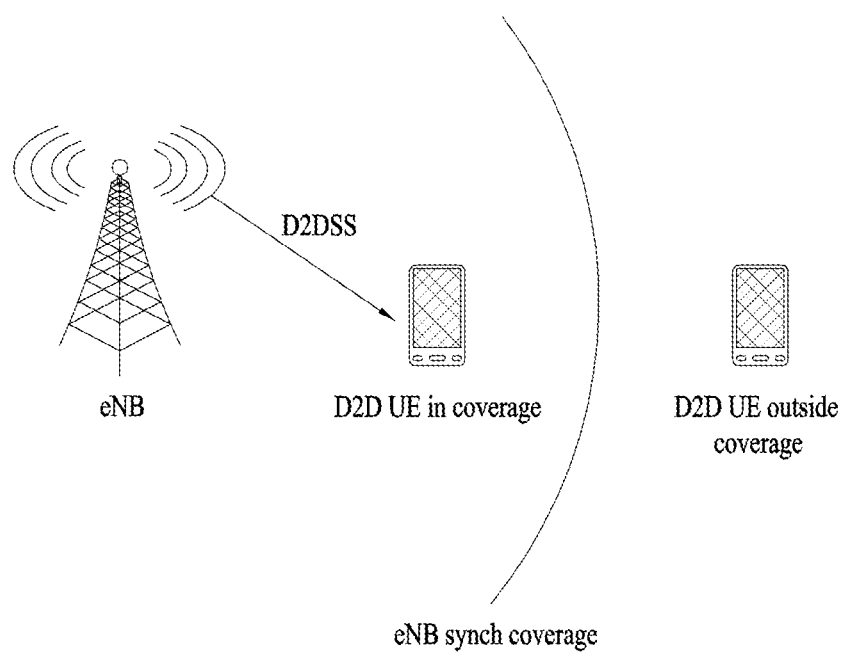
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
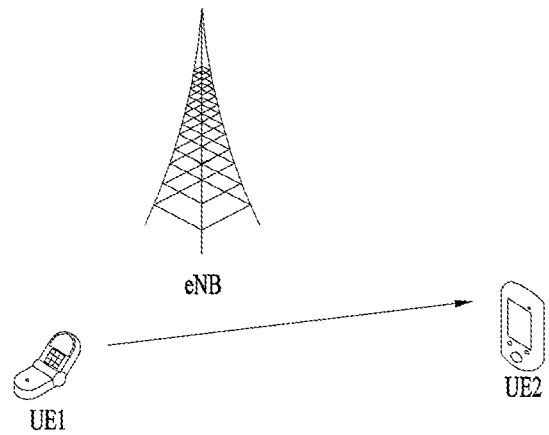
FIG. 8 is a view illustrating an exemplary D2D resource pool for D2D communication.
Figure 8:
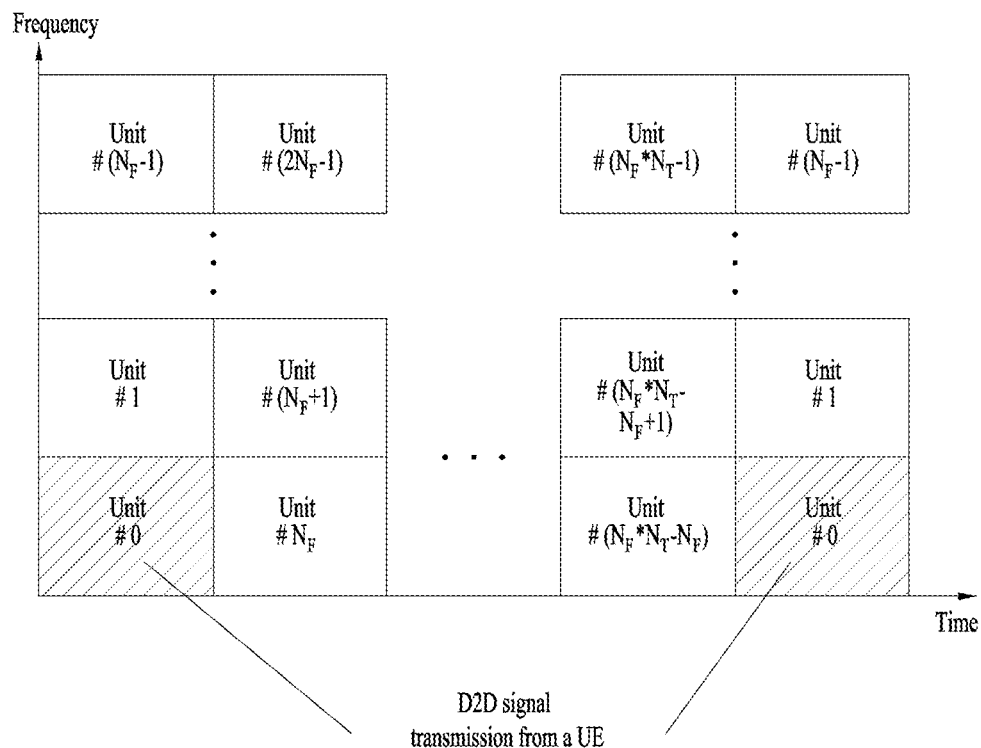

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
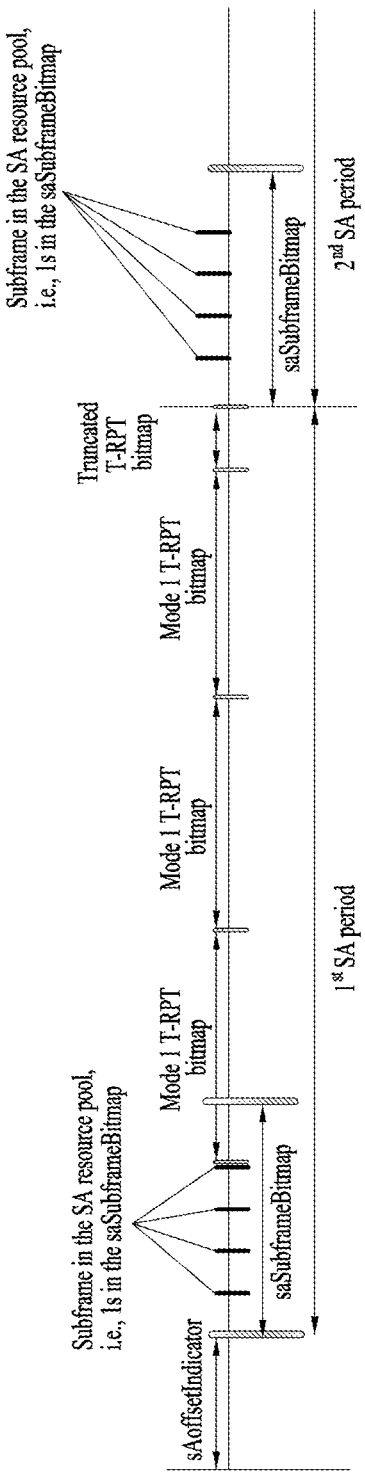
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1 s set in a T-RPT bitmap in an indicated T-RPT, and transmits one medium access control layer protocol data unit (MAC PDU) four times.

In one example, in V2V communication, a cooperative awareness message (CAM) of a periodic message type, a decentralized environmental notification message (DENM) of an event triggered message type, or the like may be transmitted. The CAM may include dynamic state information about a vehicle, such as the direction and speed of the vehicle, vehicle static data such as the dimensions of the vehicle, and basic vehicle information such as an ambient illumination state and path details. The CAM may be 50 to 300 bytes long. The DENM may be a message generated upon occurrence of an unexpected incident such as breakdown or an accident of a vehicle. The DENM may be shorter than 3000 bytes, and received by all vehicles within its transmission range. The DENM may have priority over the CAM. When it is said that a message has priority, this means to a UE that if messages are to be transmitted at the same time, a message having a higher priority is transmitted above all, or a message with a higher priority among a plurality of messages is transmitted earlier in time. From the perspective of a plurality of UEs, a high-priority message is made less vulnerable to interference than a low-priority message, thereby having a reduced reception error probability. The CAM may have a larger message size with security overhead than without security overhead.

In recent years, eV2X (enhanced V2X) is considered to have very low requirement for the reliability of the side link (block error rate or packet error rate) such as $10^{-5}$. However, when the UE periodically transmits for a certain period of time without any special action, the rate of transmission time will be a lower bound of the error rate. For example, when the UE perform a 1 ms transmission at a 100 ms period, 1% error occurs unconditionally (due to half duplex problem). Thus, the $10^{-5}$ error requirement would be achieved in the first place. In this regard, the half duplex problem refers to a situation that while user equipment (UE) that is not capable of simultaneously transmitting and receiving in a particular band performs transmission, the UE cannot receive a signal from another user equipment and thus a reception error occurs. The half duplex problem may be divided into following two cases: in the first case, while another UE may receive a message that a particular UE transmits, the particular user equipment should perform transmission; in a second case, when a particular UE has to receive a message from another UE, the particular UE performs transmission and thus fails to receive the message. Hereinafter, various methods for achieving the new requirement $10^{-5}$ on reliability described above will be described.

Embodiment 1

The first embodiment relates to a scheme for solving the half duplex problem by allowing the UE to identify a signal transmission by a neighboring user equipment and selectively avoiding the transmission or setting the TTI in a different manner. The following example is described in terms of the first UE. The second UE means a neighboring UE(s) (e.g., a UE(s) capable of directly communicating with the first UE) to the first UE.

Specifically, the first UE identifies a time resource position and/or TTI (Transmission Time Interval) used for transmission by the second UE. The first UE may determine a resource to be excluded when selecting a resource to be used for transmission by the UE based on the identified time resource position and/or TTI. Further, the first UE selects a resource to be used for transmission by itself from resources other than the excluded resource. The first UE may transmit a sidelink signal using the selected resource. The identification of the time resource position and/or TTI used for transmission by the second UE may be performed by a sensing operation (an operation of measuring energy or received power per each resource) by the first UE and/or by the first UE receiving and decoding the SA (control signal) of the second UE (The first UE grasps the position of the data resource as indicated by the control signal).

In this connection, the first UE may select transmission resources except N time resource positions and/or TTIs used by the neighboring user equipment. Specifically, in this connection, between the initial transmission resource and the re-transmission resource, other selection rules may be specified. For example, the time resource position and/or TTI for the initial transmission is always excluded when selecting the transmission resource, while the time resource position and/or TTI for re-transmission may be included as a selectable resource. That is, the resource to be excluded from the identified time resource position and/or TTI may correspond to the time resource position and/or TTI corresponding to the initial transmission among the time resource positions and/or TTIs used for the transmission by the second UE. In particular, this rule may be applied selectively only when all time resource positions and/or TTIs are determined to be being used by the neighboring user equipment. This rule may be generalized as follows. Some M (<N) time resource positions and/or TTIs among N time resource positions and/or TTIs may be set to be excluded from transmission resources for the first UE. That is, resources to be excluded from the identified time resource positions and/or TTIs may correspond to M time resource portions and/or TTIs among N time resource positions and/or TTIs used for transmission by the second UE. In this connection, the value of M may be determined differently depending on the sensing result.

Alternatively, the resources to be excluded from the identified time resource positions and/or TTIs may be all time resource positions and/or TTIs used for transmission by the second UE. This may be applied in particular when the first UE may decode the SA to check the transmission by the neighboring user equipment.

The time resource position and/or TTI corresponding to the initial transmission may be set shorter than the time resource position and/or TTI corresponding to the re-transmission. The following examples may be applied in association with the selection of the time resource position and/or TTI as described above, but may be applied independently of the above selection. In this connection, for the time resource position and/or TTI corresponding to the initial transmission, frequency multiplexing-based transmission may be not allowed, while for time resource position and/or TTI corresponding to re-transmission other than the time resource position and/or TTI corresponding to the initial transmission, frequency multiplexing-based transmission may be allowed. The half duplex problem becomes worse when the number of UEs that are subjected to the FDM at one time resource position and/or TTI increases. Shortening the time resource length and/or TTI such that the number of the user equipments which are subjected to the FDM can be reduced may allow reducing the occurrence of the half duplex problem. For example, the time resource length and/or TTI for the initial transmission is set to 0.2 ms, while the time resource length and/or TTI for re-transmission may be set to 1 ms. Thus, for the initial transmission, the TDM is allowed as much as possible to solve the half duplex problem, whereas for the re-transmission, the FDM is allowed for capacity enhancement and coverage enhancement.

When this rule is more generalized, the time resource length and/or TTI may be set differently for M (<N) transmissions among the N transmissions. For this purpose, the time resource length and/or time resource region and/or TTI for each re-transmission are predefined. Alternatively, the network may notify the user equipment via a physical layer or upper layer signal of the time resource length and/or time resource region and/or TTI for each re-transmission.

In another example, the time resource position and/or TTI length may be set differently according to the resource pool. That is, the setting of the time resource position and/or the TTI length may be different depending on the resource pool. For example, the time resource length and/or TTI length when the resource pool is allocated to a road with a number of UEs smaller than a preset value is smaller than the time resource length and/or TTI length when the resource pool is allocated to a road with a number of UEs larger than or equal to the preset value. For a resource pool that corresponds to a road that is located in a region where people/vehicles are not dense, the time resource and/or TTI is set to be larger to secure the coverage, whereas, for a resource pool that corresponds to a road located in a region where a person/vehicles are dense, the time resource and/or TTI is set to be smaller, thereby mitigating the half duplex problem. Similarly, some (M) time resources and/or TTIs among the N time resources and/or TTIs which are used to transmit a particular message may be set differently.

In another example, a reselection method of resources for unicast and broadcast may be used. To prevent the UE from continuously performing transmission at the same position as another specific user equipment when the user equipment transmits a signal, the UE detects a signal from the neighboring user equipment, and then the UE selects a time resource (TTI) position different from a resource position for transmission by the detected user equipment. The UE may perform transmission using the selected time resource position. Specifically, for example, when the UE confirms via SA decoding or energy sensing that the neighboring user equipments perform transmission in N time patterns, the UE may perform an avoiding action. For example, the UE does not select the corresponding N time patterns but the UE may select the most appropriate pattern among new time patterns as a transmission resource. The most appropriate pattern may be selected as a pattern with the lowest energy or as one of random patterns except for the previously detected time patterns, or may be randomly selected from patterns whose the energy is measured below a predetermined threshold.

In this regard, the method for avoiding the resource may be configured differently between the unicast (where message transmission is made only to a specific user equipment) and broadcast (wherein message transmission is made to all neighboring user equipments, for example, safety message transmission). In the case of the unicast, all of the resources included in the time resource for transmission by the user equipment of interest to the UE may be excluded from the transmission resource for the UE. In the case of broadcast, all of the time resources transmitted by the neighboring user equipment may be excluded from the transmission resource for the first UE. For example, it may be assumed that the UE decodes the SA of another user equipment within 100 ms and grasps the data resource transmission position for 100 ms. In this connection, when the user equipment transmitting a unicast message selects a transmission resource for itself, the UE excludes (data and/or SA) subframes used for transmission by another user equipment (user equipment to and from which the unicast message is to be sent or received or is sent or received) which the UE is interested in and selects a transmission resource for itself from remaining resources.

In the case of the broadcast, all subframes used by the neighboring user equipment to perform the transmission may be excluded when selecting the transmission resources. In this regard, there may not be a subframe to be used for transmission when all the subframes are determined to be in use. (In this case), N time resources may be randomly selected among the time resources (sub-frames) whose energy is measured to be lower than the predetermined threshold. Alternatively, time resources whose energy is measured above a predetermined threshold may be excluded regardless of the unicast/broadcast and thus transmission resources may be selected among remaining resources. When several re-transmissions are applied to solve the problem of reliability degradation due to the above-mentioned half duplex problem, the user equipment selects N time resources. In this case, a time pattern used for the transmission by a neighboring user equipment may be excluded. To be specific, a time pattern which is determined to be used by the neighboring user equipment for transmission may be excluded. For example, when the UE decodes the schedule assignment (SA) of the neighboring user equipment and determines, based on the SA, that the neighboring user equipment uses N TTIs, the UE avoids the corresponding resources.

In one example, it may be determined that when a resource is not problematic in terms of the resource selection and, thus, the corresponding resource is being used semi-persistently (during a certain time or during a certain message transmission), a transmission resource for a specific UE may cause the half duplex problem with a transmission resource for the first UE, (this may be a case when a specific user equipment that uses the same resource in a time domain as that used for transmission by the first UE is detected; for example, when the SA of the corresponding user equipment is successfully decoded). In this case, the resource reselection may be triggered. In this regard, the first user equipment, upon discovering the specific user equipment, may exclude time resources previously used by the first UE. Thus, the transmission resource may be selected among remaining resources by the first UE. Further, the first user equipment that performs this resource reselection may transmit a signal to the neighboring user equipments to inform that the first UE will change the resource which the first UE has chosen.

Embodiment 2

The second embodiment uses half duplex hopping and/or a location-based resource pool. Specifically, the second embodiment may use half duplex hopping between user equipments. When sensing and half duplex hopping are used together, and even when a specific resource is selected as an optimal resource via sensing, the first UE may use the same time resource as other user equipments by the hopping, and thus may be affected by inband emission (IBE). To reduce the effect of this IBE, the transmitting user equipment may use frequency-domain filtering or windowing (using a filter to reduce IBE in a resource region other than a transmission resource). Alternatively, a resource region where the hopping takes place may be separated according to the position of the user equipment to allow similar time resources to be used between user equipment in similar positions. In other words, a scheme may allow similar time resources to be used by between user equipment in similar locations, may perform the frequency domain filtering, thereby to mitigate the effect of IBE between the UEs. This resource selection may allow reducing the IBE, may allow the resources to be used effectively via the sensing. Further, this may also reduce the reliability loss due to the half duplex.

Following two approaches may be considered for the half duplex hopping method.

In a first approach, a type A shown in FIG. 10(a) is used for the PSCCH hopping of LTE D2D. In this approach, different resource groups are FDMed in a specific resource group. A time shift is set differently for each frequency resource among the resource groups. Thus, even when the UE performs transmission on the same time resource, different resource regions are spaced in terms of the time domain. This may solve the half duplex problem.

Figure 10:
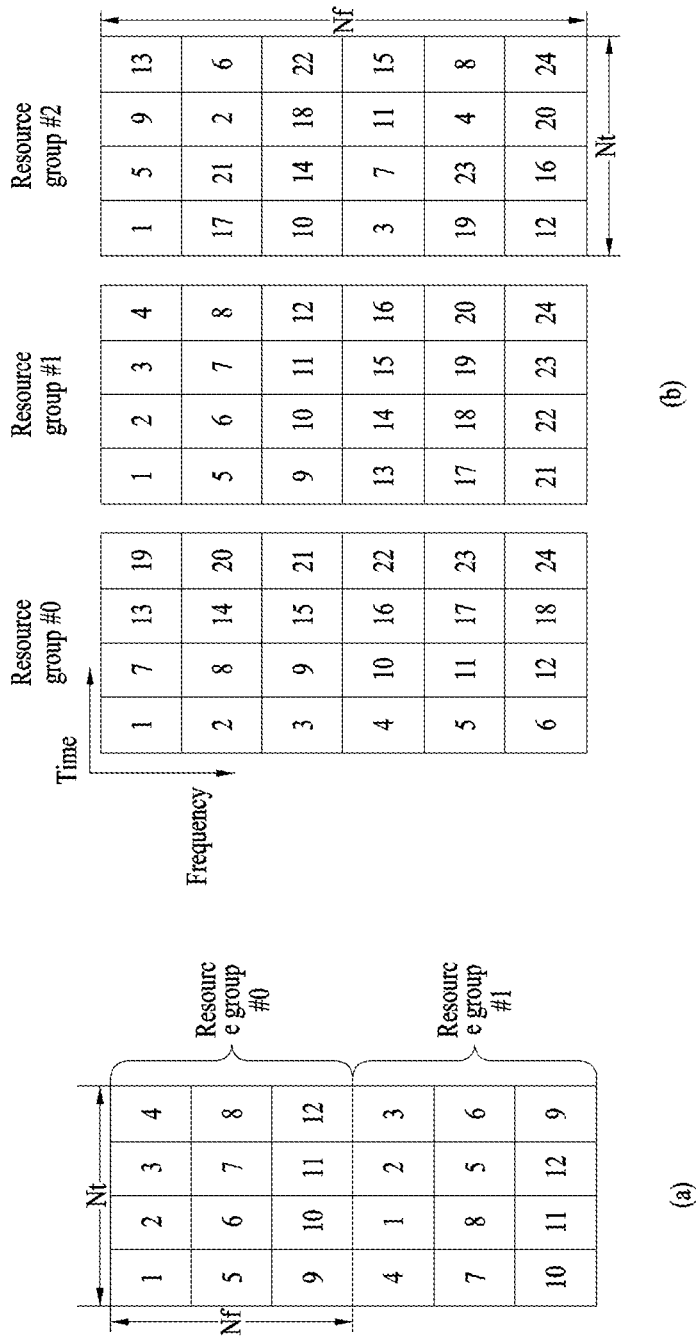
FIGS. 10 to 11 illustrate examples of the present disclosure.

In a second approach, a type B shown in FIG. 10 (b) is used for Type 2B discovery hopping of LTE D2D. In this approach, a frequency resource is preferentially indexed among the preceding resource domains, and then, a time resource is preferentially indexed among the subsequent resource domains. Thus, a position at which the resource is used may be defined via the switching of the indexes of the time resource and the frequency resource, thereby solving the half duplex problem.

Which of the two approaches as described above is used may be predefined or signaled by the network via the physical layer or higher layer signal. In addition, the time and frequency sizes and the number of resource groups in each resource region may be predefined or signaled by the network via the physical layer or higher layer signal.

In one example, in the case of PSCCH (SA) or PSDCH (discovery), the number of re-transmissions and the size of the resource are fixed. A method of controlling the number of re-transmissions or the size of resources may be classified into the following three approaches.

In a first scheme, the frequency region size of the resource may be adjusted. Specifically, there may be an approach to selecting multiple hopping resources. A approach for performing codeword-to-RE mapping in a resource at which hopping occurs while the multiple frequency resources may be used may be suggested. For example, when two consecutive hopping resources are selected in the initial transmission, transmission of a separated one hopping resource on the time region and frequency region in accordance with the hopping scheme may occur. In this case, the codeword-to-RE mapping follows a scheme prior to the hopping. That is, the codeword-to-RE mapping may be performed in the virtual resource before the hopping, and the virtual resource may be mapped to the physical resource based on the hopping pattern.

In a second approach, the number of re-transmissions of the resource may be adjusted. In this regard, the number of resource groups may be adjusted. Specifically, in both types A and B, the number of re-transmission times may be adjusted by adjusting the number of resource groups. In this approach, when all user equipment have the same number of re-transmissions, or when specific user equipment has larger or smaller number of the re-transmissions than those of other user equipments, resources are not used at all in some resource groups, which may reduce resource efficiency.

In a third approach, for each resource, a time resource is reserved by the number of re-transmissions. Thus, the re-transmission resource may be determined in conjunction with the frequency position of the initial transmission resource. the hopping resource may be determined by an approach used at the legacy PSDCH as shown in FIG. 10 (b). In this connection, the frequency resource position of the re-transmission resource may be determined by the frequency resource position of the initial transmission resource in the time resource associated with the initial transmission resource. This approach cannot mitigate the half-duplex problem via the re-transmission, but can achieve coverage gain.

Embodiment 3

Figure 11:
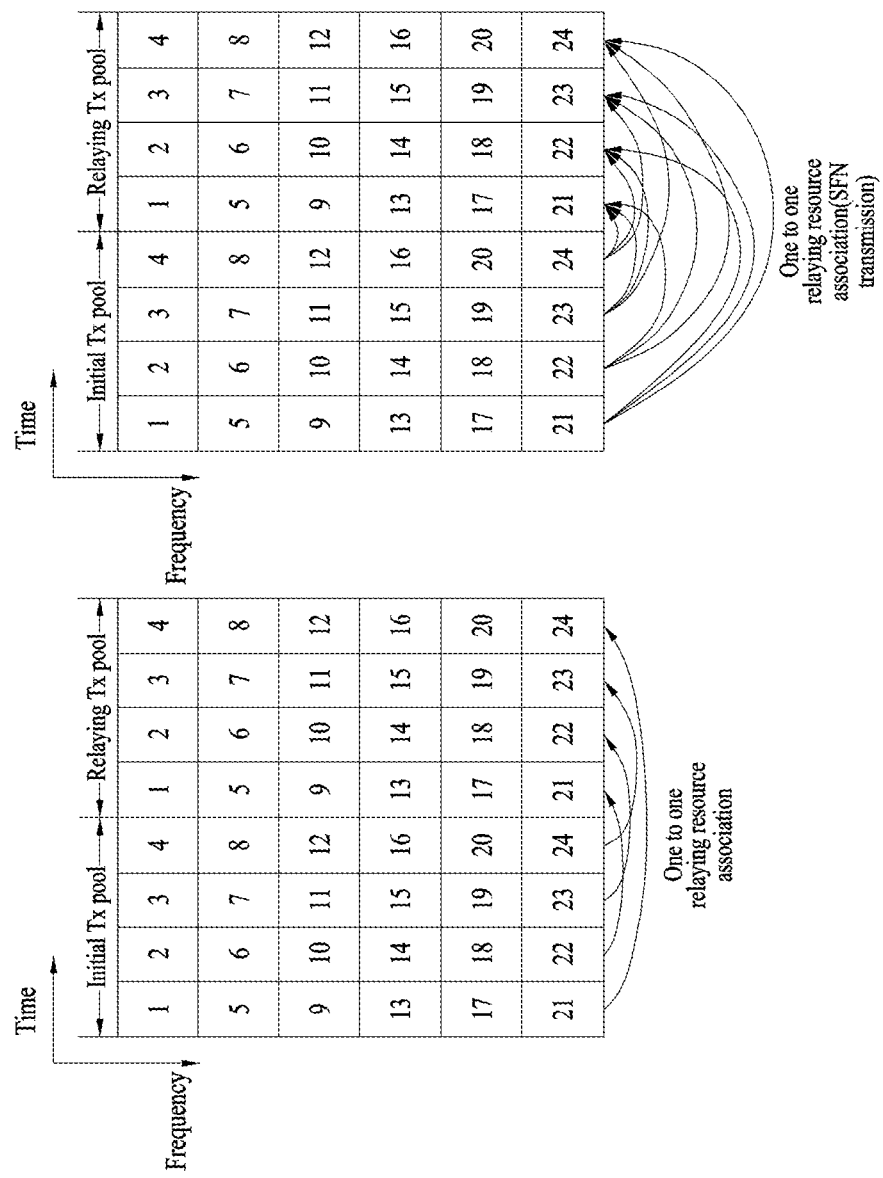

Only specific user equipment specified in advance may perform relaying operations to mitigate the half duplex problem. In this regard, when only specific user equipments are to perform relaying, corresponding user equipments may consume more power than other user equipments. Further, since the corresponding user equipments have more transmission time, the corresponding UEs may not be able to receive signals well from other user equipments. Therefore, in order to solve this problem, all the user equipments may perform the relaying operation uniformly. To do this, the initial Tx pool and the relaying Tx pool may be set separately. The association about what resources to be relayed in the relaying pool may be specified in advance, or may be indicated by the network via the physical layer or upper layer signal. For example, when an initial Tx pool and a relaying Tx pool may be present, a 1:1 mapping relationship may be created to indicate which resources to be relayed in the initial pool. In this regard, considering single frequency network (SFN) transmission, one to many mapping relationship may be created. The left side of FIG. 11 illustrates relaying in a 1:1 relationship. The user equipment performing the transmission on each resource relays the associated resource in the relaying pool. For example, a user equipment that performs an initial Tx on resource #1 relays resource $4 in the relaying pool. In this regard, each user equipment may be configured to relay only resources which the UE have successfully decoded. Alternatively, because the UE does not perform the reception anyway on the corresponding time resource, the UE may relay all of the successfully decoded resources in the associated time resource. Alternatively, when a relaying scheme based on an amplifying and forward (AF) scheme is used, the UE may relay all of the corresponding SFs.

A figure at the right of FIG. 11 shows an embodiment of one to many relaying relationship. User equipment that performs transmission on resource #1 relays resources #2, 3, and 4. In this regard, the user equipment that performs transmission on resource #2 relays resources #1, 3, and 4. Thus, SFN effect can be obtained (However, this may increase power consumption of user equipment). The UE may not be able to decode all resources within the specific region. Thus, when multiple resources are associated with a relaying resource, the probability that the UE successfully relays the resource may increase. In this regard, when retransmission on the initial Tx pool is applied, only some or all of the resources used for the re-transmission in the pool may be relayed.

While the proposed approaches are illustrated with respect to sidelink, the schemes may also be applied in terms of uplink or downlink. A subject to perform the Tx may not be user equipment but RSU or eNB.

One example of the proposed scheme illustrated above may be included as one of the implementations of the present disclosure. It is obvious that the above examples may be regarded as a kind of proposed schemes. In addition, the proposed schemes as illustrated above may be implemented independently, but may also be implemented in the form of a combination (or merged form) of some proposed schemes. Information about the applicability of the proposed approaches (or information about the rules of the proposed approaches) may be provided by the base station to the user equipment via a predefined signal (e.g., a physical layer signal or a higher layer signal). Alternatively, the information may be signaled by the transmitting user equipment to the receiving user equipment. Alternatively, a rule may be defined such that the receiving user equipment requests this information toward the transmission side user equipment.

Configuration of a device according to an embodiment of the present disclosure

Figure 12:
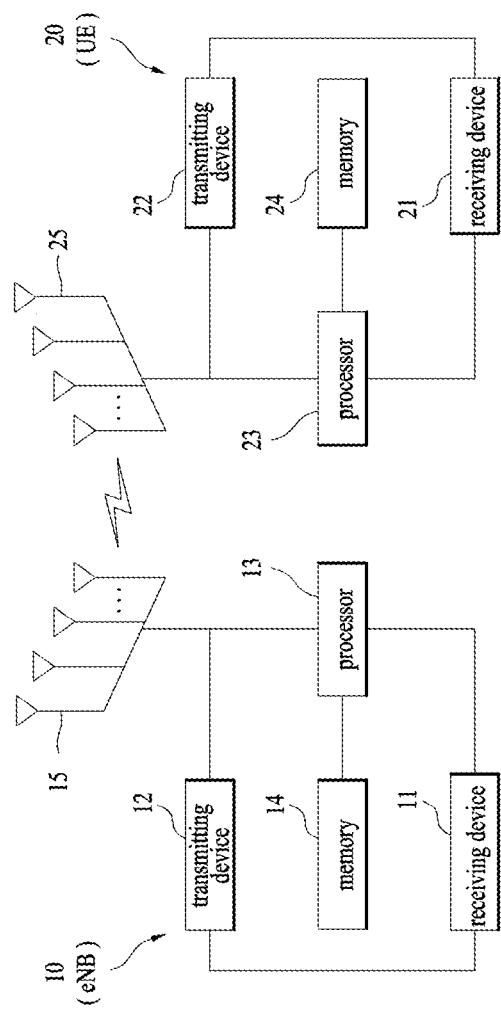
FIG. 12 shows a configuration of a transmitting and receiving device.

FIG. 12 is a diagram showing a configuration of a transmission point device and a user equipment device according to an embodiment of the present disclosure.

Referring to FIG. 12, the transmission point device 10 according to the present disclosure includes a receiver 11, a transmitter 12, a processor 13, a memory 14 and a plurality of antennas 15. The plurality of antennas 15 means a transmission point device supporting MIMO transmission/reception. The receiver 11 may receive various signals, data and information on the uplink from the user equipment. The transmitter 12 may transmit various signals, data and information on the downlink to the user equipment. The processor 13 may control the operation of the transmission point device 10.

The processor 13 of the transmission point device 10 according to one embodiment of the present disclosure may process the necessary operations in each of the embodiments illustrated above.

The processor 13 of the transmission point device 10 also functions to compute information received by the transmission point device 10 and information to be transmitted to the outside. The memory 14 may store the computed information or the like for a predetermined time. The memory may be replaced by a component such as a buffer (not shown).

Referring to FIG. 12, the user equipment device 20 according to the present disclosure includes a receiver 21, a transmitter 22, a processor 23, a memory 24, and a plurality of antennas 25. The plurality of antennas 25 means a user equipment device supporting MIMO transmission/reception. The receiver 21 may receive various signals, data and information on the downlink from the base station. The transmitter 22 may transmit various signals, data and information on the uplink to the base station. The processor 23 may control the overall operation of the user equipment device 20.

The processor 23 of the user equipment device 20 according to one embodiment of the present disclosure may process the requirements of each of the embodiments illustrated above. Specifically, the processor receives control information from the base station via the receiving device, and receives UTC timing related information for application of the control information. The processor compares the UTC timing of the UE with the Coordinated Universal Time (UTC) timing related information. The user equipment may report the timing difference to the base station when the timing difference as a result of the comparison is greater than or equal to a preset threshold value.

The processor 23 of the user equipment device 20 also functions to compute information received by the user equipment device 20, and information to be transmitted to the outside. The memory 24 may store the processed information or the like for a predetermined time. The memory may be replaced by a component such as a buffer (not shown).

The specific configuration of the above transmission point device and user equipment device may be implemented such that the foregoing examples of various embodiments of the present disclosure may be applied independently, or two or more embodiments may be simultaneously applied. The overlapping contents are omitted for the sake of clarity.

Furthermore, in the example of FIG. 12, the transmission point device 10 may be applied to a repeater device that is a subject performing uplink transmission or a subject performing uplink reception. The example of the user equipment device 20 may be applied to a repeater device which is a subject performing uplink transmission or a subject performing uplink transmission.

The embodiments of the present disclosure as described above may be implemented by various means. For example, embodiments of the present disclosure may be implemented by hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method for transmitting and receiving a sidelink signal by a first user equipment (UE) in a wireless communication system, the method comprising:
   identifying, by the first UE, a transmission time interval (TTI) used by a second UE which supports a plurality of TTIs with different time lengths;
   determining, by the first UE, a first resource to be excluded in selecting a second resource to be used for transmission to the second UE from the first UE, based on the identified TTI;
   selecting, by the first UE, the second resource to be used for the transmission to the second UE from the first UE, from among resources other than the excluded first resource; and
   performing, by the first UE, the transmission to the second UE by transmitting a sidelink signal on the selected second resource,
   wherein the plurality of TTIs supported by the second UE include a first TTI and a second TTI,
   wherein the first resource to be excluded is determined differently according to whether the first TTI is used by the second UE or the second TTI is used by the second UE, and
   wherein a time length of each of the plurality of TTIs depends on at least one of a resource pool or a number of UEs on a road.

2. The method of claim 1, wherein the first resource to be excluded based on the identified TTI includes a resource corresponding to a specific TTI used for initial transmission among the plurality of TTIs supported by the second UE.

3. The method of claim 2, wherein the specific TTI corresponding to the initial transmission is configured to be shorter than a TTI corresponding to re-transmission among the plurality of TTIs supported by the second UE.

4. The method of claim 3, wherein in a state where the specific TTI corresponding to the initial transmission is used by the second UE, frequency multiplexing-based transmission is not allowed to the first UE.

5. The method of claim 3, wherein in a state where the TTI corresponding to re-transmission other than the specific TTI corresponding to the initial transmission is used by the second UE, frequency multiplexing-based transmission is allowed to the first UE.

6. The method of claim 1, wherein the first resource to be excluded based on the identified TTI includes resources corresponding to M TTIs among the plurality of TTIs supported by the second UE.

7. The method of claim 6, wherein the M is determined according to a sensing result that is performed by the first UE.

8. The method of claim 1, wherein the first resource to be excluded based on the identified TTI includes resources corresponding to all the plurality of TTIs supported by the second UE.

9. The method of claim 1, wherein the TTI used by the second UE is identified based on a result of sensing by the first UE.

10. The method of claim 1, wherein the TTI used by the second UE is identified based on a result of decoding by the first UE of control information transmitted by the second UE.

11. The method of claim 1,
   wherein a TTI with a first time length is used in a state where the number of UEs on the road is smaller than a preset value, and a TTI with a second time length is used in a state where the number of UEs on the road is equal to or larger than the preset value, and
   wherein the first time length is longer than the second time length.

12. A user equipment (UE) configured to transmit and receive a sidelink signal in a wireless communication system, the UE comprising:
   a transmitter and a receiver; and
   a processor configured to control the transmitter and the receiver, wherein the processor is further configured to:
   identify a transmission time interval (TTI) used by another UE which supports a plurality of TTIs with different time lengths;
   determine a first resource to be excluded in selecting a second resource to be used for transmission to the another UE from the UE, based on the identified TTI;
   select the second resource to be used for the transmission to the another UE from the UE, from among resources other than the excluded first resource; and
   perform the transmission to the another UE by controlling the transmitter to transmit a sidelink signal on the selected second resource,
   wherein the plurality of TTIs supported by the another UE include a first TTI and a second TTI,
   wherein the first resource to be excluded is determined differently according to whether the first TTI is used by the another UE or the second TTI is used by the another UE, and wherein a time length of each of the plurality of TTIs depends on at least one of a resource pool or a number of UEs on a road.

* * * * *